United States Patent [19]

Jones

[11] Patent Number: 5,255,129
[45] Date of Patent: Oct. 19, 1993

[54] MAGNETIC CODE READER WITH ADJUSTABLE THRESHOLDS

[76] Inventor: Philip B. Jones, Peartree Cottage, Slough Road, High Easter, Chelmsford, Essex CM14RD, United Kingdom

[21] Appl. No.: 773,858

[22] PCT Filed: Sep. 19, 1990

[86] PCT No.: PCT/GB90/01446
§ 371 Date: Oct. 17, 1991
§ 102(e) Date: Oct. 17, 1991

[87] PCT Pub. No.: WO91/04549
PCT Pub. Date: Apr. 4, 1991

[30] Foreign Application Priority Data

Sep. 22, 1989 [GB] United Kingdom ............... 8921435

[51] Int. Cl.[5] .................................................. G11B 5/09
[52] U.S. Cl. ........................................ 360/40; 235/449
[58] Field of Search ..................... 235/449; 360/40, 48

[56] References Cited

U.S. PATENT DOCUMENTS

| | | | |
|---|---|---|---|
| 3,593,334 | 7/1971 | Bickel | 360/40 |
| 3,735,372 | 5/1973 | Coccagna | 360/40 |
| 4,219,152 | 8/1980 | Couch et al. | 360/40 |
| 4,612,653 | 9/1986 | Livingston et al. | 360/40 |
| 4,837,642 | 6/1989 | Smidth | 360/40 |

*Primary Examiner*—David C. Nelms
*Assistant Examiner*—K. Shami
*Attorney, Agent, or Firm*—Iandiorio & Dingman

[57] ABSTRACT

A reader for a coded discontinuous security thread in a security document comprises a multiplicity of reading channels each coupled to at least one magnetic transducing means (11, 40) for sensing along a track across the document and including processing circuits for forming a channel signal which exhibits signal excursions in response to the passage of the ends of each length of magnetic material. First and second comparators (55, 56) compare the channel signal with relatively positive and relatively negative thresholds respectively and a bistable switching means (59) is coupled to the comparators to provide a digital signal. A reference comparator (64) controls an analog switch and diode pumps (70, 71) to adjust the thresholds in accordance with the amplitude of a signal excursion.

9 Claims, 4 Drawing Sheets

MAGNETIC CODE READER WITH ADJUSTABLE THRESHOLDS

This invention relates generally to a machine which is preferably used in conjunction with a document sorting machine, and is intended to read and verify coded information contained within a magnetic strip or stripe, herein called 'thread' on a bank note or other security document.

There are many difficulties in providing a machine which can with great reliability read and verify coded information with in practical terms absolute accuracy. Some of the difficulties arise from the nature of the document and its usage. The document is normally in paper form and is often folded or crumpled by a user. Although it is desirable to incorporate a hidden form of coding, such as a code embodied in a so-called security thread, if the coding is to be any more than trivial, that is to say is to have some relationship to a serial number of the bank note or some other coded significance, the physical embodiment of the coding must be robust and not readily susceptible to damage or error.

For these and a variety of other reasons, magnetically coded threads are generally considered to be preferable. Although the present invention is not limited to use with any particular form of magnetic coding, the preferred form of the invention is intended for use with bank notes or other security documents including magnetically coded threads as described in the International Patent Application published under No. WO90/08367 having a priority date of the 20th January 1989. Important characteristics of such a thread are that binary digits are represented by bit cells of substantially constant length and that a sequence of bits of the same binary value are represented by a continuous portion of the magnetic material, the length of the portion corresponding to the number of bits in the sequence. The thread is preferably discontinuous, bits of the other binary value being denoted by the absence of the said magnetic material. If there are several contiguous bits the material will be absent for a corresponding number of bit lengths. However, the bits of the other binary value may be represented by lengths (which may be contiguous) of different magnetic material instead of the absence of material.

A problem in the design and organisation of a reader of a security thread is that in practice it is difficult to ensure that a security document will be presented to a reading machine in a uniform manner, that is to say always with its edges properly aligned parallel to some given axis of presentation. Furthermore, the position of a security thread or coding on it may vary. A versatile reader intended for use with a multiplicity of differently coded threads or having the same general format and capable of validating a variety of different documents, such as bank notes of different denominations or currencies, must be able to detect the coding of the security thread presented, in general, anywhere on the bank note. It is customary to provide a security thread which runs entirely across a bank note but even so it is necessary to be able to detect a thread which may be positioned, possibly askew, anywhere across the a bank note. Since there are practical limitations on the track width of a magnetic transducer, in order to be able to detect a security thread reliably it is desirable in practice to provide an array of magnetic heads in order to sense along a respective one of a multiplicity of parallel tracks extending approximately parallel to the direction in which the document is moved, by any suitable transport mechanism, through the reader.

A difficulty in the scanning of a security document for the presence of a correctly coded magnetic security thread is the existence of other regions of the document containing magnetised or magnetisable matter, for example magnetic ink. Signals from such regions will inevitably be picked up by an array of heads which are intended to ensure that signals are picked up from a security thread which might appear anywhere within the bank note. In order to distinguish between magnetic portions forming part of the security thread and other magnetic regions it is desirable to employ a threshold comparator in any channel coupled to a magnetic head which scans a track across a security document. The threshold could be set to distinguish between the comparatively strong signal excursions associated with a magnetic security thread and the comparatively weak excursions that are associated with magnetic script or other markings. Nevertheless the use of a fixed threshold has certain disadvantages. For example, degradation arising from rough usage of the security document may produce degradation of a signal level such that a fixed threshold may not be reached. Furthermore, it is desirable, as described hereinafter, to provide a magnetic head array in which each head is coupled to two adjacent channels such that each signal channel receives the sum of the signals picked up by adjacent magnetic heads. Typically, this results in a doubling of the signal strength of the comparatively weak signals from magnetic regions not so narrowly confined as a security thread and the doubling of the amplitude of weak signals narrows the available range which can be used to discriminate between signal excursions associated with a security thread and signal excursions associated with other magnetic areas.

One object of the present invention is to provide an improved reader for use with security documents or bank notes having magnetically coded security threads. The basis of the invention is a system for adjusting thresholds which enable the reader to distinguish between signal excursions associated with the magnetically coded thread and the normally weaker signal excursions associated with noise or with other magnetically coded regions of the security document or bank note.

In particular, in a preferred form of the invention, the reader comprises an array of magnetic heads each coupled to at least one of a multiplicity of signal processing channels. For each channel there may be a pair of comparators for comparing a channel signal with respective thresholds set for relatively positive and relatively negative excursions of the channel signal, switching means coupled to the comparators to provide a digital signal in accordance with signal excursions sensed by the comparators, a reference comparator for comparing the channel signal with a reference level and means responsive to the reference comparator to the thresholds of the first and second comparators. Particularly, the threshold adjusting means may be responsive to the detection of a signal value exceeding the reference level to increase the thresholds of the comparators for a time which corresponds to the maximum permitted run length of similar bits in the code embodied in the security thread.

The thresholds may according to the invention be initially set quite low in order to ensure that a signal excursion arising from an edge of a magnetic region on a security document is not missed but thereafter the thresholds may h=raised so as to increase the discrimination against noise or relatively weak signal excursion arising from magnetic regions not forming part of the magnetic security thread. Once a strong signal is received there is a presumption that the particular channel is receiving signals from a magnetic thread and the adjustable thesholds can be increased for a time which exceeds the maximum allowable absence of flux reversal associated with the general format of the magnetic code.

In a practical form of the invention, the thresholds for the positive and negative excursions may be adjusted by means of diode pumps controlled according to the state of the reference comparator.

It is preferable to couple the comparators and/or the switching means so that a change in the binary state of bits in the data stream produced by the switching means is produced in response to the sensing of a reverse slope or trailing edge of a signal excursion and to provide means for increasing the threshold of at least one and preferably both comparators in accordance with the amplitude of the signal excursion. This facilitates the accurate measurement of a run length, i.e. the distance from the leading end of a length of magnetic material and the trailing end of that length notwithstanding variation in signal strength or asymmetry in the signal which is produced by the respective transducer or thansducers feeding the processing channel.

DETAILED DESCRIPTION

Figure 1:
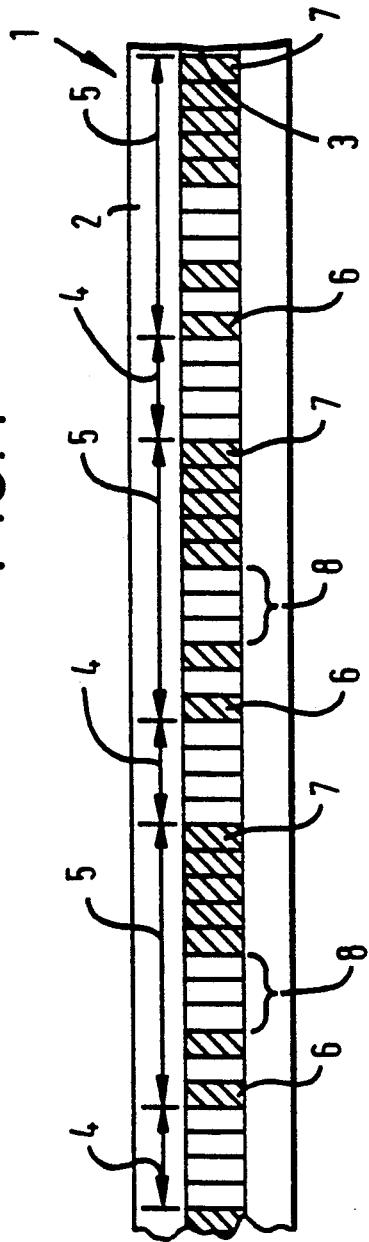
FIGS. 1 and 2 illustrate respective forms of magnetically coded thread suitable for use with a reader according to the invention.

FIG. 1 of the drawings shows part of a security thread 1 which may comprise in a typical form a carrier such as a plastic strip 2 which may be of a suitable polyester. The surface of the strip 2 may be coated by vacuum deposition with aluminium. Along the security thread 1 is a discontinuous track of magnetic material. For convenience of understanding, the track is shown as divided into equal bit cells 3. Those bit cells which are cross hatched denote magnetic material and the bit lengths which are blank denote absence of magnetic material. This form of thread is preferred but it is not the only form available: there may be different magnetic material instead of the absence of material.

Bit cells of the thread are of substantially equal length. Typically each bit cell may be 2 mm long. The magnetic thread or track is coded so that alternate segments 4 and 5 succeed each other along the length of the thread. The segments 4 are termination segments which separate and define the beginning and end of two successive word segments. Each word segment 5 in a given magnetic thread has the same length and has start and finish bits 6 and 7. The numeral 8 denotes the longest run of zeros permitted within a word segment. In the example shown the word length is eleven bits. Employing the convention that the presence of magnetic material in a bit length connotes a "1" and the absence of material connotes a "0", the particular coding for each word segment 5 in the strip shown in FIG. 1 is 10100011111. Where there is a run of "1" bits it is constituted by a continuous length corresponding to the number of bits in the run.

Figure 2:
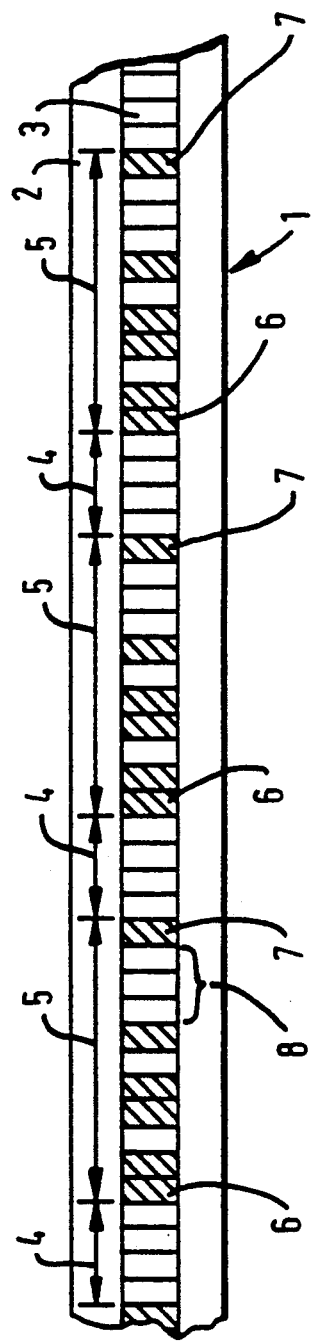

FIG. 2 shows a similar thread having the same general format in terms of word length and termination length but with a different code for the characteristic word (11011010001).

The security thread may be incorporated within the bank note or security document in known manner, preferably during the manufacture of the paper, and disposed such that there is a layer of paper between the thread and each broad surface of the document.

The security threads shown in FIGS. 1 and 2 correspond to the security threads disclosed in the aforementioned international patent application.

The particular coding of a thread may vary according to the denomination or currency or both of a bank note and may therefore be used for validation of a bank note in a system including a sorter.

It is preferable to decode a security thread of the kind shown in FIG. 1 or 2 by means of an array of magnetic heads disposed so that regardless of some skewing of the thread relative to the direction of movement of the security document through a reader at least one channel and preferably each of a plurality of channels develops a succession of signal excursions of which, for example, positive excursions are caused by the passage of a boundary beginning a length of magnetic material and a negative excursion is produced by a boundary denoting the end of a length of magnetic material. A binary switching means may be set to one state and the other by the positive and negative excursions respectively and may be sampled at, for example, a frequency corresponding to a multiple of the fundamental data rate (i.e. the rate at which bit cells pass a given point) in order to remove noise and ultimately to produce a digital data stream which corresponds to the digital coding of the security thread.

Figure 3:
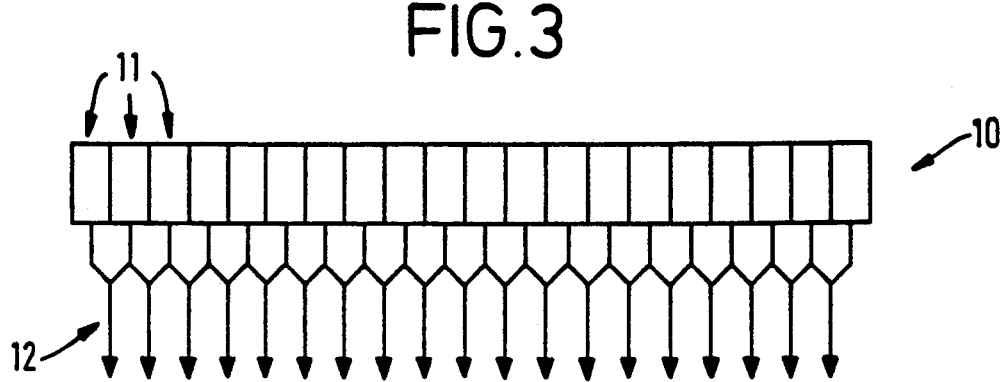
FIG. 3 is a schematic representation of an array of magnetic heads.

FIG. 3 illustrates schematically an array 10 of magnetic heads. The magnetic heads 11 would be (in accordance with known practice) disposed across the path of the document so that the magnetic strip ideally passes at right angles to the line of the heads. The heads 11 are connected to output lines 12 such that each line provides for a respective analog processing channel a signal which is the sum of the signals played back by a respective pair of adjacent heads. This has the effect of broadening the region which produces signal excursions in any given channel. Thus notwithstanding significant skewing of the document relative to the linear array the output of at least one channel should contain signal excursions in accordance with the coding of the thread. Typically there may be twenty heads and nineteen lines. Normally the reader would be constructed to limit physically any possible skewing to that which can be accomodated by the reading heads.

Figure 4:
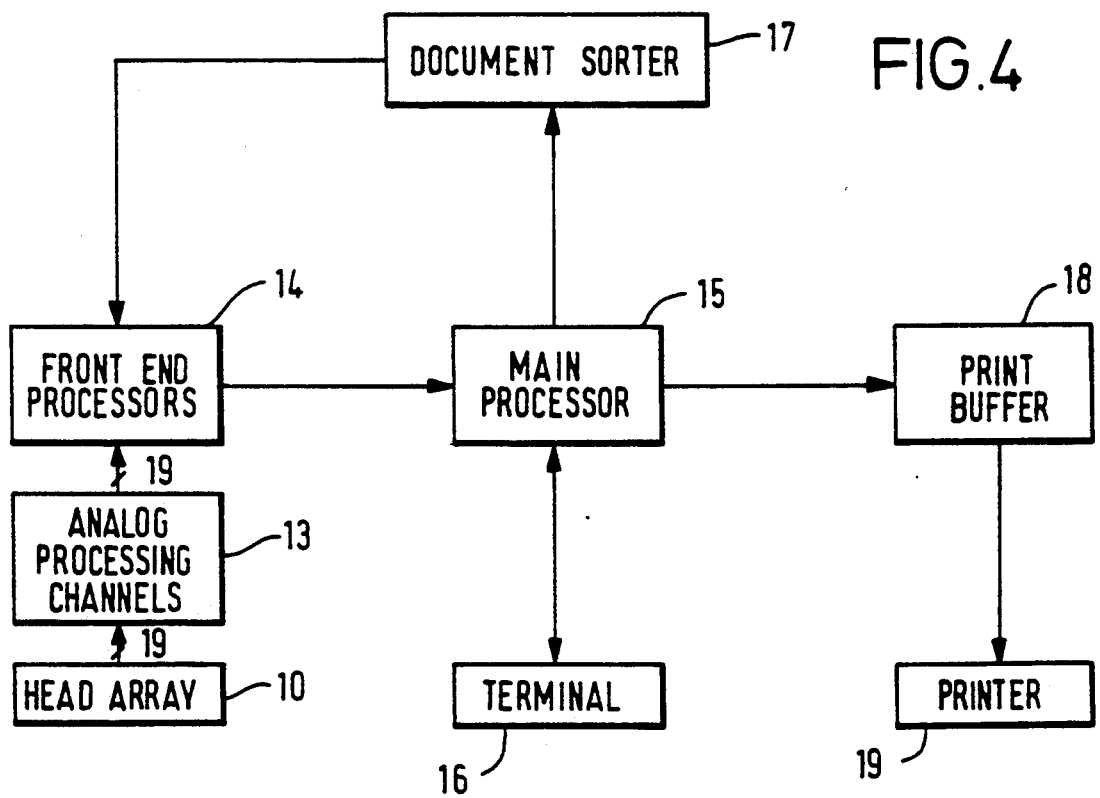
FIG. 4 is a general layout of a reader and document sorter system according to the invention.

FIG. 4 illustrates the general features of a document reading and sorting system. The system includes the head array 10, a set of analog processing channels 13, a set of front end processors 14, a main processor 15 which receives data from the front end processors and provides validation data to a document sorter 17 which is operative to reject documents which are judged invalid by the system. The main processor communicates with an operator's terminal 16 and also controls by way of a buffer 18 a printer 19 which can provide a hard copy of a report of document failures or such other information as may be selected by the operator by way of the terminal.

Front end processors have a variety of purposes which may be understood with reference to the requirements of a magnetic reader which is required to achieve a judgment of the validity of a bank note in a comparatively short time.

The general idea is to provide, for analysis by the main processor, a binary map. The map has a width corresponding to the number of data streams and a length corresponding to at least the of bit lengths along the scanning direction of the document. The binary map is tested to see whether any particular column contains the binary code required for validation of the document.

Analysis of the binary map may proceed along known lines and is not intended to be directly part of the present invention.

For any given document, where there is a substantial number of scanning channels fed by a respective head or heads, only a few channels will produce outputs in response to the security thread. Accordingly, in each front end processor there may be means for counting signal transitions exceeding a selectable minimum number, so as to obtain for each of the channels a count of the signal excursions appearing in the respective channel. It will be known from the coding of the particular binary word which is characteristic of the documents that are being examined what the minimum number of excursions there can be. For example, in the threads coded according to FIG. 1, since the coding is arranged such that there is at least one complete binary word and at least two complete termination segments in the security thread, there must be at least six excursions during the scanning of the document. In the example shown in FIG. 2 there must be at least eight excursions. The particular minimum number of excursions is related to the bit length of the word and the particular coding of the word though ascertaining the mere number of excursions does not enable decoding of the word.

The front end processors may provide a simple count of the signal excursions so as to enable the main processor to start its examination of the binary map, immediately the reading process is finished, from a channel which provided the most signal excursions.

Figure 5:
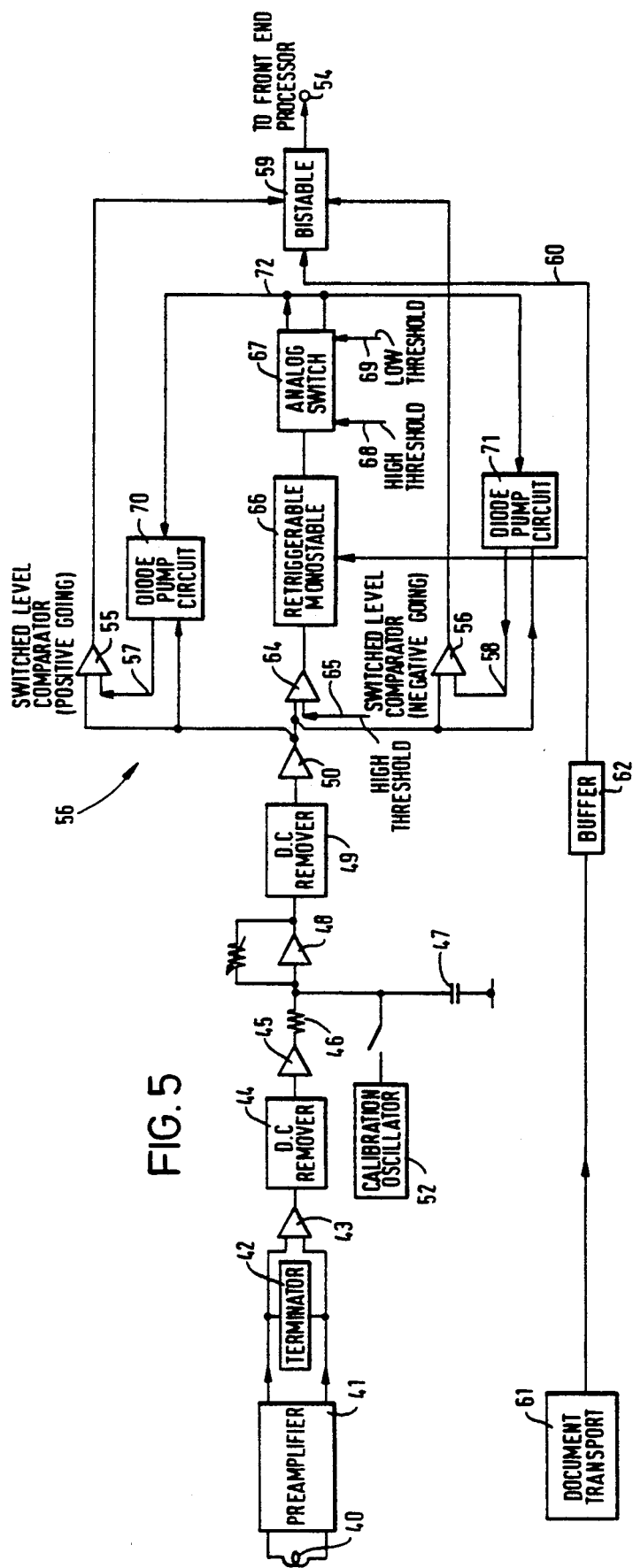
FIG. 5 is a diagram of an analog processor for disposition in a signal processing channel between a magnetic head and a front end processor.
Figure 6:
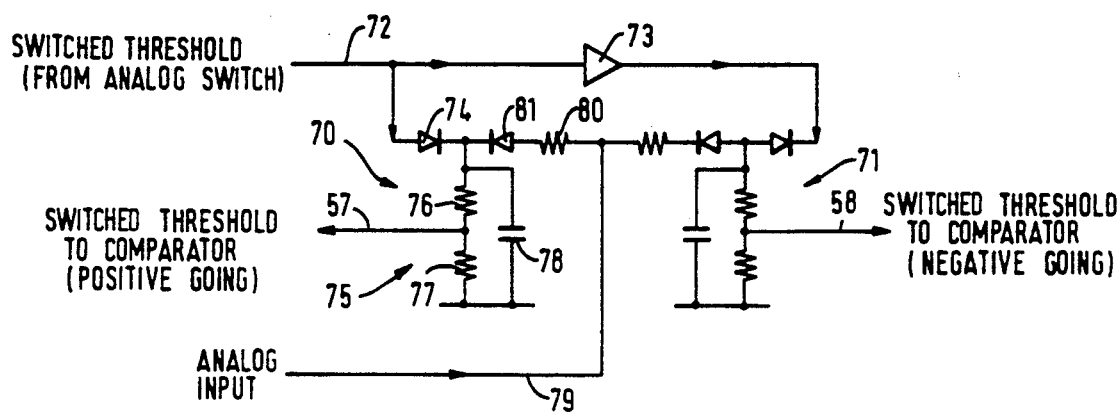
FIG. 6 is a diagram of a diode pump circuit forming part of the analog processor shown in FIG. 5.

FIG. 5 illustrates an analog processor which is provided in each channel before the respective front end processor. The magnetic transducers associated with the channel are shown as a coil 40 connected to a pre-amplifier 41 driving a terminator 42 across which is coupled an amplifier 43 having a low pass characteristic. This amplifier provides an output through a DC remover 44 to a voltage follower 45. The output of the voltage follower is coupled by way of resistor 46 to the input of a variable gain amplifier 48, the output of which is connected by way of a DC remover 49 and voltage follower 50 to the input of a main processing circuit 51.

A low-pass filter is provided by a capacitor 47 coupled between the input of the amplifier 48 and ground. A calibration oscillator 52 can be connected to the input of the amplifier 48 on closure of a switch 53.

The purpose of the various stages between the magnetic transducer 40 (or pair of transducers coupled in parallel) and the processing circuit 51 is to provide a channel signal which in response to the passage of a length of magnetic material in the security thread past the transducer produces two signal excursions, one in response to the leading end of the length of magnetic material and the other in response to the passage of the trailing end. For convenience it is preferable to arrange for the excursion produced in response to the leading edge to be 'positive' and this convention will used in the following description. Each signal excursion may have the general form shown in FIG. 7. This shows a generally positive excursion A which is in the form of a generally sinusoidal pulse. The negative excursion is of similar shape but of opposite sense. The peak amplitude of the excursion depends on the signal strength and may vary substantially.

The signal in the channel is compared with two variable thresholds. One threshold is a threshold which is positive relative to a nominal zero datum for the channel signal and the other threshold is negative relative to the datum. The positive threshold is provided for a first comparator 55 on a line 57 and the negative threshold provided for a second comparator 56 on a line 58. A bistable circuit 59 is coupled to respond to the states of the comparators 55 and 56 so as to alternate between states in response to alternate positive and negative excursions exceeding the respective thresholds. This bistable is cleared before reading commences by a strobe signal on a line 60 which is coupled to a document transport mechanism 61 by way of a buffer 62. The construction and operation of the document transport is not relevant to the present invention. Thereafter the bistable is put into one binary state by a signal from the comparator 55 and changes state only if the other comparator 56 changes state. Thus the bistable will be put into one state in response to the beginning of a length of magnetic material in the security thread and put into the other state in response to the end of the length of magnetic material. In order to convert the state of the bistable as denoted by the output 54 into a bit stream the front end processor may sample the output at a frequency which is a multiple of the basic data rate of the security thread; this rate is proportional to the speed of transport of the document and can readily be derived from it. Sampling at a multiple of the data rate facilitates the removal of noise. The final digital data stream corresponding to a column of the bit map is provided by the front end processor corresponding to the respective channel.

Figure 7:
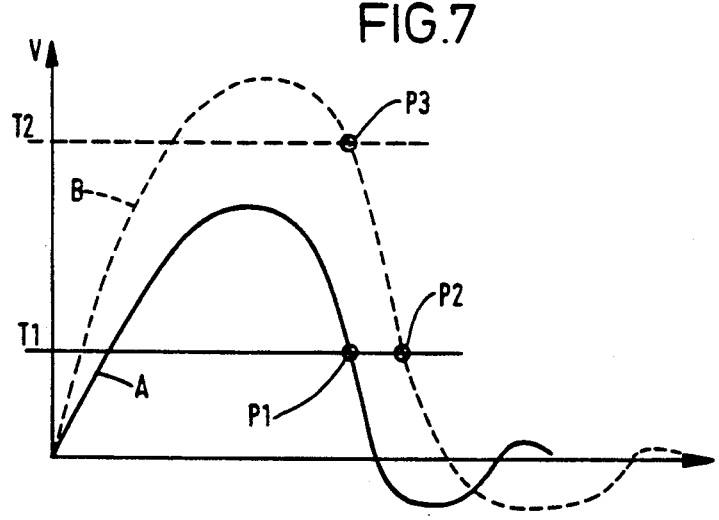
FIG. 7 is an explanatory waveform diagram.

As will be explained further with reference to FIG. 7, it is desirable to arrange for the switching of the bistable 59 to be in response to the crossing of the thresholds in the reverse sense, that is to say in a negative going sense for the positive threshold and in a positive going sense for the negative threshold, so that the switching of the bistable is performed in response to the trailing or reverse slope of the respective excursion.

The channel signal is also fed to a reference comparator 64 which compares the channel signal to a high threshold value on a line 65. The output of the comparator triggers a monostable circuit 66 which provides a pulse of programmable duration to an analog switch 67. This can provide an output which is either at a high value, as set on a line 68, or at a low value as set by a line 69. The high value is preferably set to correspond to the reference threshold on the line 65 for the reference comparator. It is preferable also for the analog switch to have a default setting in which the low threshold on 69 is fed on an output line 72 and to be switched for the duration of each pulse from monostable 66 to provide the high threshold value on line 72. Diode pump circuits 70 and 71 are coupled to receive the output of switch 67 by way of a line 72.

The delay, corresponding to the length of the monostable pulse, should correspond to at least the maximum time between flux reversals sensed by the magnetic head, namely the maximum run length of similar bits in the code. The monostable is preferably retriggerable in response to each positive excursion sensed by the reference comparator 64.

The high threshold is selected to be below the normal signal strength of excursions produced in response to the leading end of a length of magnetic strip in the security thread. Initially therefore the thresholds set for the comparators 55 and 56 will be at the low levels set by the threshold value on line 69. If the amplitude of a positive going excursion exceeds the reference level corresponding to the high threshold, the comparator 64 senses the crossing of the threshold and provides by way of the monostable 66 a signal to operate the analog switch to provide the high threshold to the diode pump circuits. In the absence of any further action in response to the amplitude of the signal excursion (as described later) the thresholds for the comparators 55 and 56 will be increased to the magnitude of the high threshold.

FIG. 5 illustrates the diode pump circuits 70 and 71. The input line 72 from the analog switch is directly connected to the diode pump circuit 70 and is connected by way of an inverter 73 to the diode pump circuit 71. The two circuits are similar and differ only in that they are arranged for operation with different polarities.

The diode pump circuit 70 includes a diode 74 in series with a voltage divider 75 comprising resistors 76 and 77, the divider being in parallel with a capacitor 78. The output of the voltage divider is coupled by way of the line 62 to the comparator 55 as previously described. The voltage across the divider will correspond to the threshold value provided by the analog switch.

The diode pump circuit also has an input on a line 79 from the node 61. The line 79 is coupled by way of resistor 80 and diode 81 to the junction between diode 74 and the divider 75. The analog input is similarly coupled to the diode pump 71.

If the analog input signal is less positive than the threshold value on line 72, then the analog input has no effect on the diode pump 70. If however the analog input increases the threshold value on line 72, current flows through the forwardly biased diode 81 to the divider 75 so as to raise the threshold set by the line 62 in proportion to the amplitude of the signal excursion. The analog input has a similar effect in the reverse sense on the diode pump 71.

As previously noted, the comparators 55 and 56 are arranged so that the bistable 59 is switched on the reverse slope of the respective signal excursion. In FIG. 7 is shown a threshold T1 as set by the comparator 55. The intersection of the threshold and the excursion A is denoted by the point P1 and at this point the state of bistable 59 changes.

If the amplitude of the excursion is very much greater, as shown by the curve B, the switching will occur at the point P2, which is at the same voltage level but delayed in time with respect to the point P1.

The action of the analog input on the diode pump 70 is to increase the sensing threshold to, for example, the level denoted as T2. This provides a sensing point P3 which is higher than but at approximately the same time as the point P1.

Accordingly, with appropriate choice of resistors and capacitor in the diode pump circuit and the choice of thresholds, the sensing of a crossing of a threshold set by the comparators 55 and 56 may h=made substantially immune to variations in signal amplitude.

I claim:

1. A reader for a coded security thread in a security document, wherein a sequence of consecutive bit cells of the same binary value is represented by a corresponding length of a magnetic material, the reader comprising:

at least one reading channel (41-51) coupled to at least one magnetic transducing means (11,40) for sensing along a track across the document and including processing circuits for forming a channel signal which exhibits a signal excursion of one sense in response to the passage of a leading end of a said length past the transducing means and a signal excursion of an opposite sense in response to the passage of a trailing end of the said length past the transducing means;

first and second comparators (55,56) for comparing the said channel signal with relatively positive and relatively negative thresholds respectively;

switching means (59) coupled to the comparators to provide a digital signal in accordance with the passage of the channel signal through the respective thresholds; and control means (64-71) for adjusting the said thresholds in accordance with the amplitude of a signal excursion.

2. A reader according to claim 1 in which the control means comprises a reference comparator (64) for comparing the channel signal with a reference level; and means (66,70,71) for increasing the said thresholds in response to the exceeding of the reference level.

3. A reader according to claim 2 in which the said means for increasing comprises means (67) for switching each threshold from a comparatively low threshold relative to a datum to a comparatively high threshold.

4. A reader according to claim 2 in which the means for increasing includes means (66) for providing a temporary increase in the thresholds for at least the maximum time for the passage of a discrete length of the magnetic material past the transducing means.

5. A reader according to claim 4 in which the switching means (59) is caused to switch in response to a reverse passage of a signal excursion through a threshold and the control means includes means (80,81) responsive to an increase of a signal excursion above a threshold to increase the threshold at least for the remaining duration of the respective excursion.

6. A reader according to claim 5 in which the means for increasing comprises for each of the first and second comparators a diode pump circuit (70,71) each of which has a first input diode coupled to a source (67) of a threshold signal, a second input diode coupled to the channel signal and an output coupled to provide the threshold for the respective one of the first and second comparators.

7. A reader according to claim 1 in which there is a multiplicity of channels each coupled to at least one transducer which scans a respective one of a plurality of tracks across the security document.

8. A reader according to claim 7 in which each channel is coupled to two adjacent transducers (11).

9. A reader according to claim 7 in which a processor (15) is arranged to examine a binary map of the document for the presence of a characteristic code embodied in the thread, the binary map being constituted by data streams provided by the multiplicity of channels.

* * * * *